US009477116B2

(12) United States Patent
Hiraka

(10) Patent No.: US 9,477,116 B2
(45) Date of Patent: Oct. 25, 2016

(54) LIGHT EMITTING DEVICE, SURFACE LIGHT SOURCE DEVICE AND DISPLAY APPARATUS

(71) Applicant: Enplas Corporation, Saitama (JP)

(72) Inventor: Kensuke Hiraka, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 14/657,074

(22) Filed: Mar. 13, 2015

(65) Prior Publication Data

US 2015/0267877 A1 Sep. 24, 2015

(30) Foreign Application Priority Data

Mar. 18, 2014 (JP) .................................. 2014-055132

(51) Int. Cl.
| | | |
|---|---|---|
| *G02F 1/335* | (2006.01) | |
| *G02F 1/1335* | (2006.01) | |
| *G02B 19/00* | (2006.01) | |
| *G02B 5/02* | (2006.01) | |

(52) U.S. Cl.
CPC ..... *G02F 1/133603* (2013.01); *G02B 19/0028* (2013.01); *G02B 19/0066* (2013.01); *G02F 1/133611* (2013.01); *G02B 5/0278* (2013.01); *G02F 2001/133607* (2013.01)

(58) Field of Classification Search
CPC .................. G02F 1/133603; G02F 1/133607; G02F 1/133611; G02B 19/0028; G02B 19/0066
See application file for complete search history.

(56) References Cited

U.S. PATENT DOCUMENTS

2010/0195315 A1* 8/2010 Ohkawa ............... G02B 6/0016
362/97.1

FOREIGN PATENT DOCUMENTS

JP 2007-048883 A 2/2007

* cited by examiner

*Primary Examiner* — Thomas M Sember
(74) *Attorney, Agent, or Firm* — Brundidge & Stanger, P.C.

(57) ABSTRACT

A light emitting device comprises a light emitting element and a light flux controlling member configured to control the distribution of light emitted from the light emitting element. The light flux controlling member comprises an incidence surface including an outer incidence surface including an inclining surface formed such that the distance from the light emitting element increases as the distance from the optical axis of the light emitted from the light emitting element increases and an inner incidence surface, a reflection surface disposed on a side of the light flux controlling member opposite to the incidence surface, and a emission surface disposed to surround the optical axis. Light emitted from the light emitting surface center of the light emitting element does not reach the inclining surface.

8 Claims, 17 Drawing Sheets

LIGHT EMITTING DEVICE, SURFACE LIGHT SOURCE DEVICE AND DISPLAY APPARATUS

CROSS REFERENCE TO RELATED APPLICATIONS

This application is entitled to and claims the benefit of Japanese Patent Application No. 2014-055132, filed on Mar. 18, 2014, the disclosure of which including the specification, drawings and abstract is incorporated herein by reference in its entirety.

TECHNICAL FIELD

The present invention relates to a light emitting device including a light flux controlling member configured to control the distribution of light emitted from a light emitting element, and a surface light source device and a display apparatus including the light emitting device.

BACKGROUND ART

In recent years, light emitting diodes (hereinafter referred to as "LED") have been used as a light source for lighting from the perspective of energy saving and miniaturization. Moreover, light source units for radiating light (light emitting device) each including an LED and an optical element for converting light direction (light flux controlling member) configured to control the distribution of light emitted from the LED combined with each other have been increasingly used instead of fluorescent lighting or halogen lamps (see for example PTL 1).

FIG. 1 is a cross-sectional view of a light source unit for radiating light 10 disclosed in PTL 1. Substrate 40 on which light source unit for radiating light 10 is mounted is shown by a broken line in FIG. 1. As illustrated in FIG. 1, light source unit for radiating light 10 disclosed in PTL 1 comprises LED 20 and optical element for converting light direction 30 disposed at a position intersecting optical axis LA of the light flux emitted from LED 20. Optical element for converting light direction 30 comprises incidence surface 31 on the LED side (rear side), reflection surface 32 disposed on the opposite side to incidence surface 31 (front side), emission surface 33 on the lateral side, and inclining surface 34 connecting incidence surface 31 with emission surface 33. In a plane including optical axis LA of light emitted from LED 20, inclining surface 34 is disposed so that the distance from LED 20 increases as the distance from optical axis LA increases.

The light emitted from LED 20 is incident on incidence surface 31, reflected laterally by reflection surface 32, and then emitted from emission surface 33 laterally. It is to be noted that the light emitted from LED 20 does not enter optical element for converting light direction 30 from inclining surface 34. The light emitted from LED 20 is thus controlled to be emitted laterally by optical element for converting light direction 30 in light source unit for radiating light 10 disclosed in PTL 1.

CITATION LIST

Patent Literature

PTL 1: Japanese Patent Application Laid-Open No. 2007-048883

SUMMARY OF INVENTION

Technical Problem

In light source unit for radiating light 10 disclosed in PTL 1, since optical element for converting light direction 30 is disposed adjacent to LED 20, light emitted from LED 20 does not directly reach inclining surface 34. However, when using LED 20 having a large light emitting surface, or disposing optical element for converting light direction 30 far from LED 20, light emitted form LED 20 may directly reach inclining surface 34 and leaked light may be generated in the direction directly above LED 20 because the light flux cannot be controlled as intended.

An object of the present invention is to provide a light emitting device that allows for prevention of leaked light in the direction directly above the light emitting device, and reduction in the weight of a light flux controlling member at the same time. Another object of the present invention is to provide a surface light source device and a display apparatus including the light emitting device.

Solution to Problem

A light emitting device of the present invention comprises a light emitting element and a light flux controlling member configured to control the distribution of light emitted from the light emitting element, the light flux controlling member being disposed over the light emitting element, wherein the light flux controlling member comprises: an incidence surface configured such that light emitted from the light emitting element is incident on the incidence surface, the incidence surface comprising an outer incidence surface formed as an inclining surface such that the distance from the light emitting element increases as the distance from an optical axis of the light emitted from the light emitting element increases, and an inner incidence surface connected with an inside of the outer incidence surface; a reflection surface configured to laterally reflect the light incident on the incidence surface, the reflection surface being disposed on a side of the light flux controlling member opposite to the incidence surface such that the distance from the light emitting element increases in the direction from the center to the outer periphery of the reflection surface; and an emission surface configured to emit the light reflected by the reflection surface, the emission surface being disposed to surround the central axis: and light emitted from the light emitting surface center of the light emitting element does not reach the inclining surface.

A surface light source device of the present invention comprises the light emitting device of the present invention, and a light diffusion member configured to allow the light emitted from the light emitting device to pass therethrough while diffusing the light.

Further, a display apparatus of the present invention comprises the surface light source device of the present invention and a cover configured to allow light emitted from the surface light source device to pass therethrough while diffusing the light.

Advantageous Effects of Invention

The light emitting device, surface light source device and display apparatus of the present invention allow for prevention of light leakage in the direction directly above the light emitting device while reducing the weight of the light flux controlling member.

DESCRIPTION OF EMBODIMENTS

Hereinafter, embodiments of the present invention will be described in detail with reference to the accompanying drawings. In the following description, as representative examples of surface light source devices of the present invention, surface light source devices suitable for backlights of liquid crystal display apparatuses or the like will be described. These surface light source devices may be used as display apparatuses in combination with members to be irradiated (e.g. liquid crystal panels) to which light from the surface light source devices is radiated.

Embodiment 1

Configurations of Surface Light Source Device and Light Emitting Device

Figure 1:
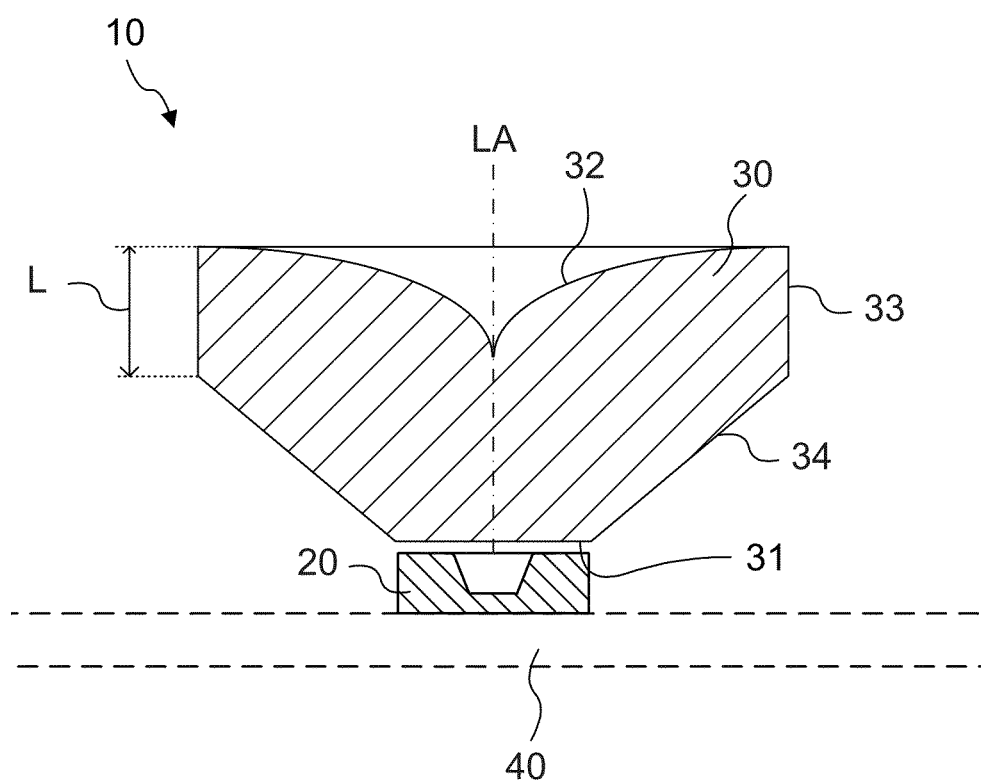
FIG. 1 is a cross-sectional view of a light source unit for radiating light according to PTL 1.
Figure 2A:
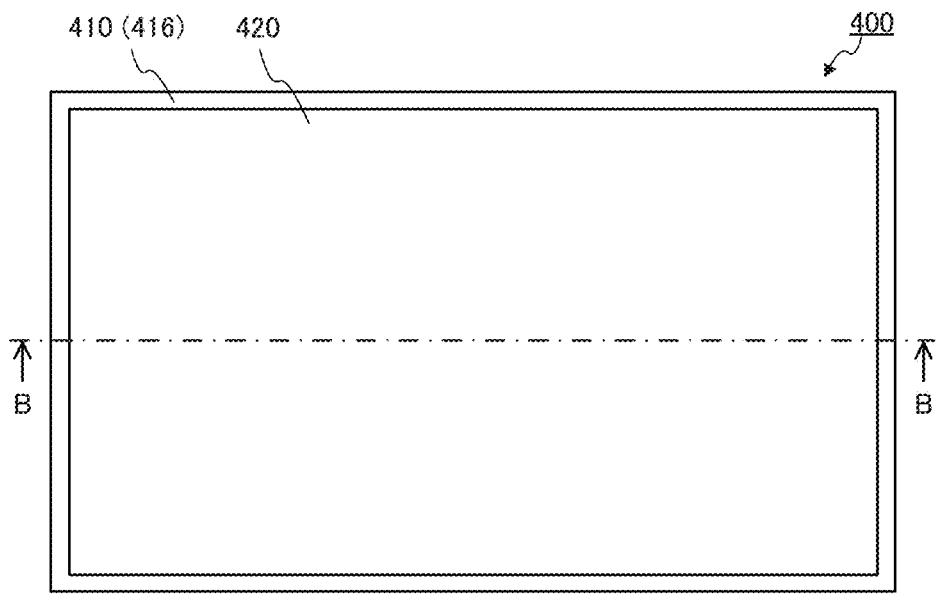
FIGS. 2A and 2B illustrate a configuration of a surface light source device according to Embodiment 1.
Figure 2B:
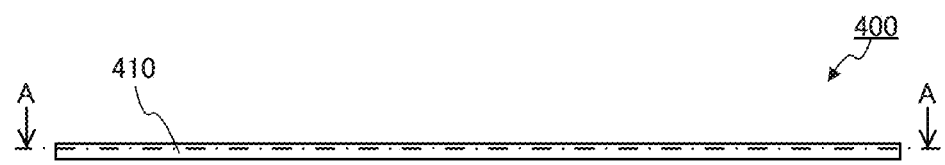
Figure 3A:
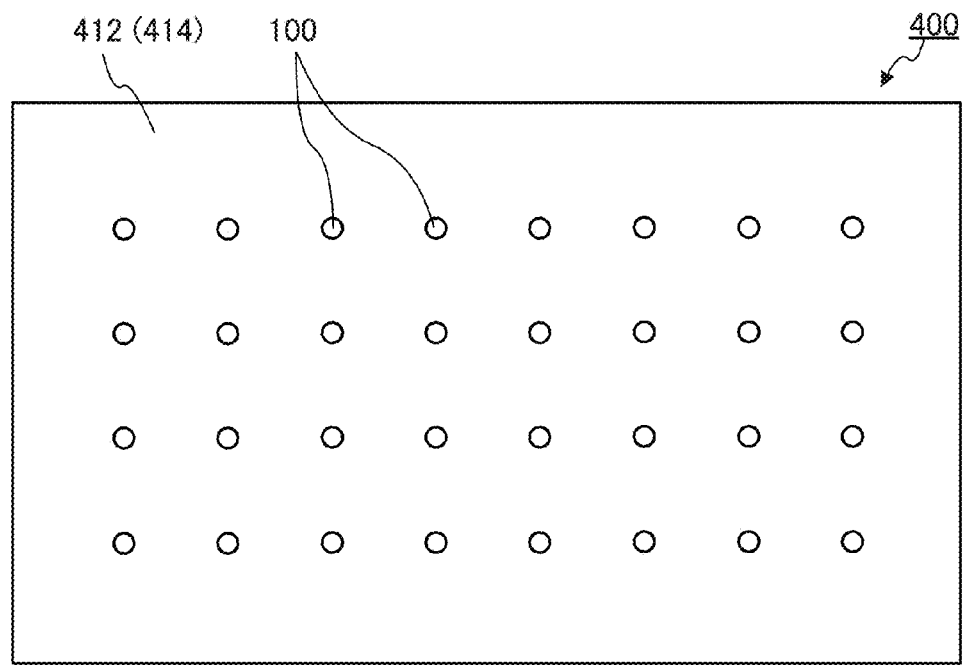
FIGS. 3A and 3B illustrate the configuration of the surface light source device according to Embodiment 1.
Figure 3B:
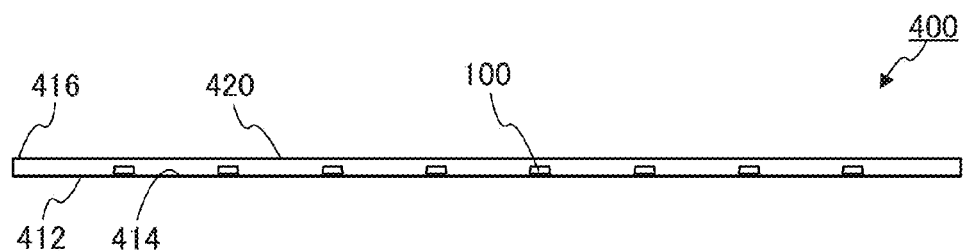
Figure 4:
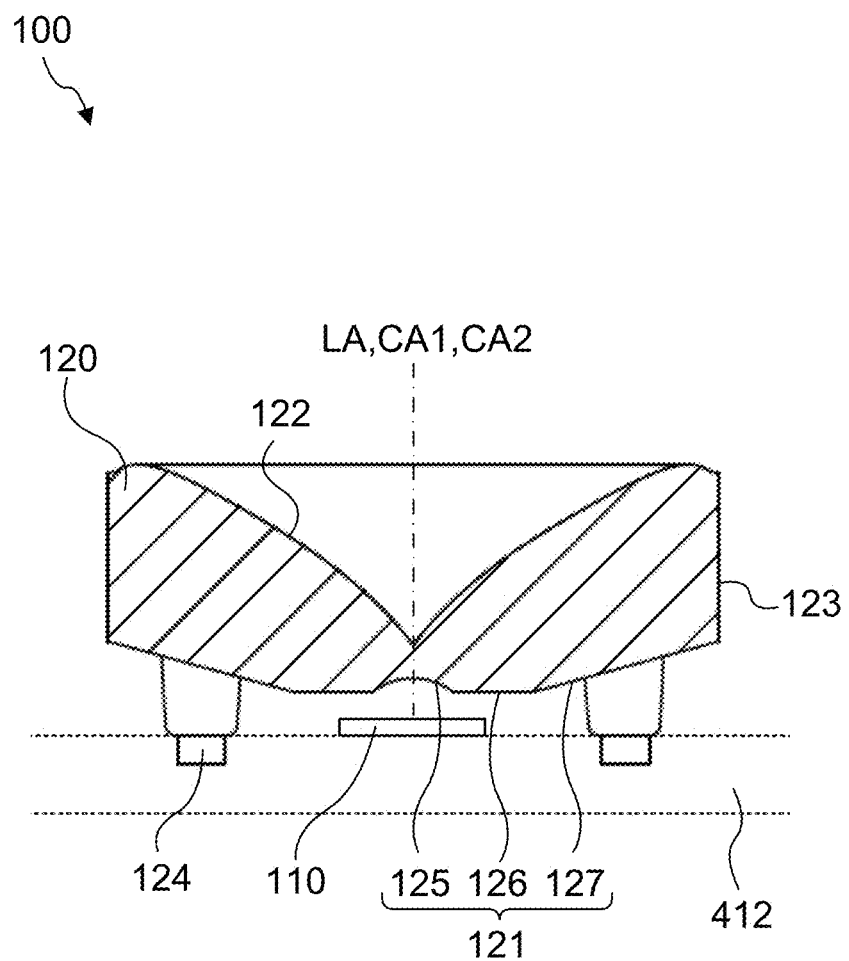
FIG. 4 is a cross-sectional view of a light emitting device according to Embodiment 1.

FIGS. 2A to 4 illustrate a configuration of surface light source device 400 according to an embodiment of the present invention. FIG. 2A is a plan view and FIG. 2B is a front view of surface light source device 400 according to Embodiment 1 of the present invention. FIG. 3A is a cross-sectional view taken along line A-A shown in FIG. 2B, and FIG. 3B is a cross-sectional view taken along line B-B shown in FIG. 2A. FIG. 4 is a cross-sectional view of light emitting device 100 according to Embodiment 1 of the present invention.

As illustrated in FIGS. 2A to 3B, surface light source device 400 according to the present embodiment comprises casing 410, light diffusion member 420, and a plurality of light emitting devices 100. Light emitting devices 100 are disposed in a matrix on inner surface 414 of bottom plate 412 in casing 410. Inner surface 414 of bottom plate 412 functions as a diffusion and reflection surface. Further, top plate 416 of casing 410 has an opening. Light diffusion member 420 is disposed so as to cover the opening, and functions as a light emitting surface. The size of the light emitting surface is, for example but not limited to, about 700 mm in length and about 400 mm in width.

Light diffusion member 420 is a plate-shaped member having light diffusivity, which allows the light emitted from light emitting device 100 to pass therethrough while diffusing the light. Normally, the size of light diffusion member 420 is substantially the same as the size of a member to be irradiated such as a liquid crystal panel. For example, light diffusion member 420 is formed of a light-transmissive resin such as polymethylmethacrylate (PMMA), polycarbonate (PC), polystyrene (PS) or styrene-methylmethacrylate copolymer resin (MS). To confer light diffusivity, fine irregularities are formed on the surface of light diffusion member 420, or light diffusion elements such as beads are dispersed in light diffusion member 420.

As illustrated in FIG. 4, light emitting device 100 comprises light emitting element 110 and light flux controlling member 120 disposed over light emitting element 110. Light emitting element 110 is a light-emitting diode (LED) such as a white light-emitting diode. Light flux controlling member 120 controls the distribution of light emitted from light emitting element 110. Light flux controlling member 120 is disposed such that central axis CA1 thereof coincides with optical axis LA of light emitting element 110.

(Configuration of Light Flux Controlling Member)

Figure 5A:
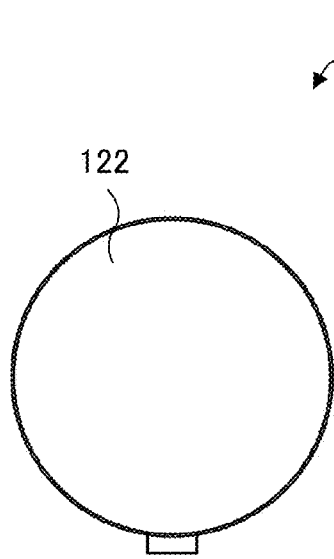
FIGS. 5A to 5C illustrate a configuration of a light flux controlling member.
Figure 5B:
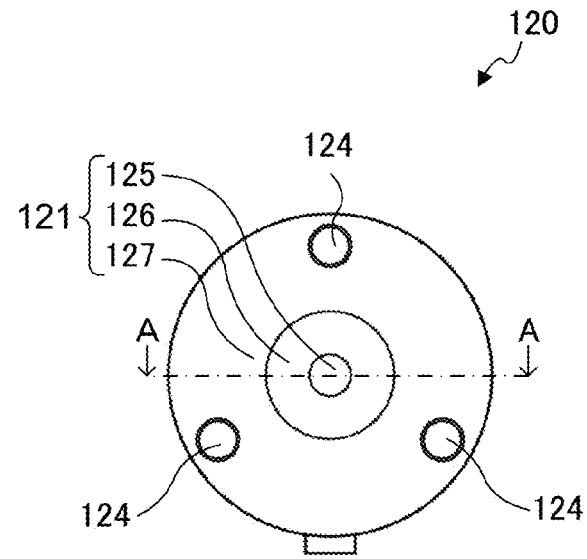
Figure 5C:
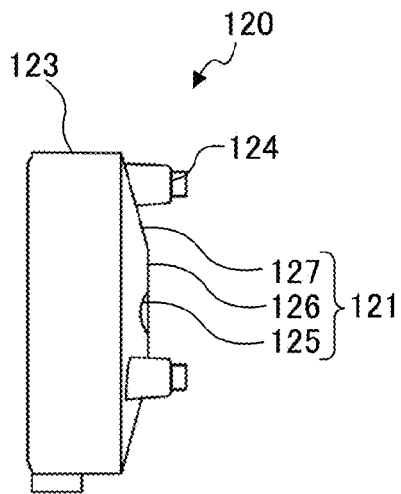

FIGS. 5A to 5C illustrate a configuration of light flux controlling member 120 according to Embodiment 1. FIG. 5A is a plan view, FIG. 5B is a bottom view and FIG. 5C is a side view of light flux controlling member 120.

As illustrated in FIGS. 4 to 5C, light flux controlling member 120 comprises incidence surface 121 disposed on the rear side, reflection surface 122 disposed on the front side (opposite side to incidence surface 121), and emission surface 123 disposed on the lateral side. Legs 124 for positioning a later-described light flux controlling member body to bottom plate 412 may be formed on incidence surface 121. The material of light flux controlling member 120 is not particularly limited as long as light with desired wavelength can pass through. For example, the material of light flux controlling member 120 is a light-transmissive resin such as polymethylmethacrylate (PMMA), polycarbonate (PC) or epoxy resin (EP), or glass. Light flux controlling member 120 may be produced by injection molding.

Incidence surface 121 allows part of light emitted from light emitting element 110 to be incident thereon. Incidence surface 121 comprises an inner incidence surface including concave surface 125 and rear surface 126, and an outer inclining surface including inclining surface 127.

Concave surface 125 is formed at a central portion of the rear side (light emitting element 110 side) of light flux controlling member 120. Concave surface 125 allows part of the light emitted from light emitting element 110 to be incident thereon. In the present embodiment, concave surface 125 is a rotationally symmetric (circularly symmetric) surface in a substantially spherical crown shape and is formed so that the distance from light emitting element 110 decreases as the distance from optical axis LA increases. Central axis CA2 of concave surface 125 and central axis CA1 of light flux controlling member 120 coincide with each other. Among light beams emitted from light emitting element 110, a light beam having small angle with respect to optical axis LA is incident on concave surface 125.

Rear surface 126 is disposed outside concave surface 125. Rear surface 126 allows part of the light emitted from light emitting element 110 to be incident thereon. In the present embodiment, rear surface 126 is a flat surface perpendicular to central axis CA1. Rear surface 126 is extending in the directions orthogonal to central axis CA1 from the outer rim part of concave surface 125. Among light beams emitted from light emitting element 110, a light beam having larger angle with respect to optical axis LA than the light incident on concave surface 125 is incident on rear surface 126.

Inclining surface 127 is disposed outside rear surface 126. Inclining surface 127 allows part of the light emitted from light emitting element 110 to be incident thereon. Inclining surface 127 is disposed so that the distance from light emitting element 110 increases as the distance from central axis CA (optical axis LA) increases. Inclining surface 127 is formed at an angle so as not to intersect an optical path of light that is emitted from the light emitting surface center of light emitting element 110 and incident on the outer edge of the inner incidence surface. That is, among light beams emitted from the light emitting surface center of light emitting element 110, a light beam having larger angle with respect to optical axis LA than the light incident on rear surface 126 is not incident on inclining surface 127, but part of light emitted from the edge of light emitting element 110 is incident on inclining surface 127. In the present embodiment, legs 124 are formed on inclining surface 127.

Reflection surface 122 laterally reflects the light incident on incidence surface 121. Reflection surface 122 is a rotationally symmetric (circularly symmetric) surface about central axis CA1 of light flux controlling member 120. The generatrix line of the rotationally symmetric surface from the center to the outer periphery is a recessed curve with respect to light emitting element 110, and reflection surface 122 is a curved surface formed by rotating the generatrix line by 360° about central axis CA1 (see FIG. 4). That is, reflection surface 122 comprises an aspherical curved surface whose height from light emitting element 110 increases in a direction from the center to the outer periphery. Further, the outer periphery of reflection surface 122 is formed at a position whose distance (height) from light emitting element 110 in the direction of optical axis LA of light emitting element 110 is larger than that of the center of reflection surface 122. For example, reflection surface 122 is an aspherical curved surface whose height from light emitting element 110 increases in a direction from the center to the outer periphery, or an aspherical curved surface whose height from light emitting element 110 (bottom surface 412; substrate) increases from the center to a predetermined position in a direction from the center to the outer periphery and then the height decreases from the predetermined position to the outer periphery in the same direction. In the former case, the inclining angle of reflection surface 122 with respect to the surface direction of bottom surface 412 decreases in the direction from the center to the outer periphery. In the latter case, reflection surface 122 has a point located between the center and the outer periphery, and closer to the outer periphery; the inclining angle of the point with respect to the surface direction of bottom surface 412 is zero (parallel to bottom surface 412). Although "generatrix line" generally means a line for drawing a ruled surface, the term as used herein includes a curve for drawing reflection surface 122 that is a rotationally symmetric surface.

Emission surface 123 emits light reflected by reflection surface 122 to the outside of light flux controlling member 120. Emission surface 123 is disposed so as to surround central axis CA1. In the present embodiment, emission surface 123 is a curved surface along central axis CA1. In a cross-section including central axis CA1, the top of emission surface 123 is connected with reflection surface 122, and the bottom of emission surface 123 is connected with inclining surface 127.

Leg 124 is a part for positioning the light flux controlling member body including incidence surface 121, reflection surface 122 and emission surface 123 with respect to bottom surface 412. In the present embodiment, three legs 124 are disposed on incidence surface 121 (inclining surface 127).

(Simulation)

In light emitting device 100 of the present embodiment, optical paths of light emitted from light emitting element 110, and brightness on a light diffusing plate disposed on and perpendicular to optical axis LA of the light emitted from light emitting element 110 were simulated. The diameter of light flux controlling member 120 used for the simulation was 13 mm, and the distance between light emitting element 110 and light flux controlling member 120 was set to 1.2 mm. For comparison, a light emitting device including a light flux controlling member which does not include concave surface 125 or inclining surface 127 (plane shaped incidence surface 121') (hereinafter referred to as "light emitting device of comparative example;" see FIG. 8) instead of light flux controlling member 120 of the present embodiment was also simulated.

Figure 6:
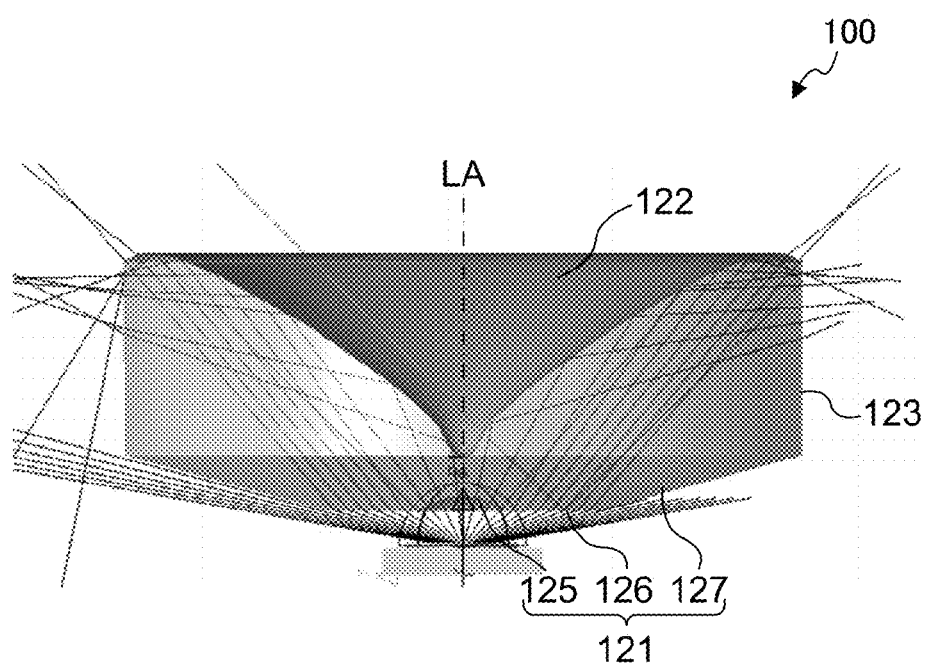
FIG. 6 is a view of optical paths in the light emitting device according to Embodiment 1.
Figure 7A:
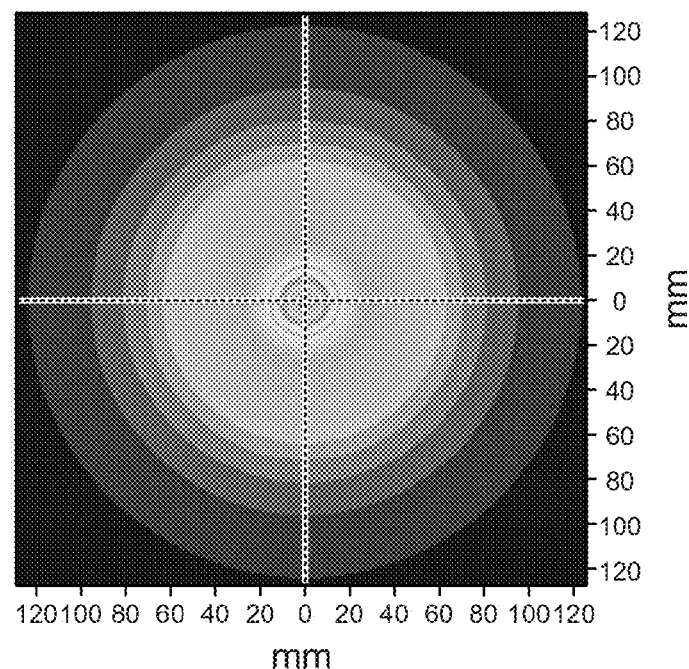
FIGS. 7A and 7B illustrate a simulation of light brightness using the light emitting device according to Embodiment 1.
Figure 7B:
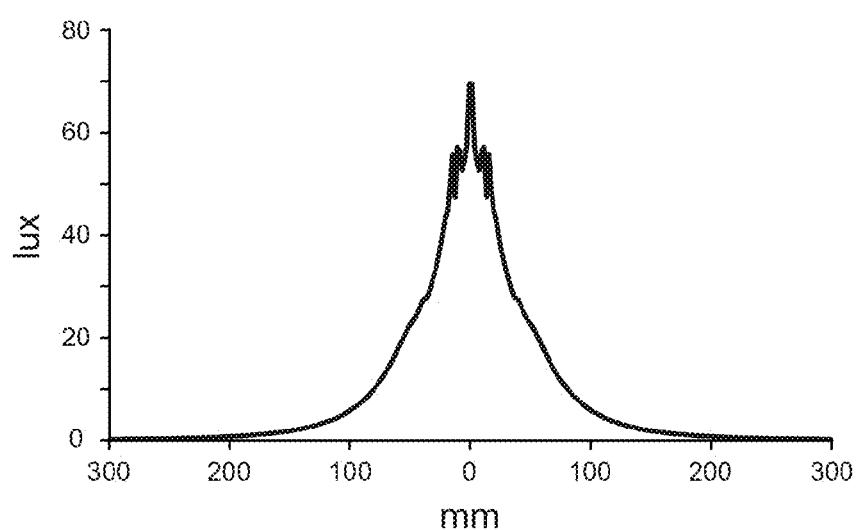

FIG. 6 is a view of optical paths of light emitted from the light emitting surface center of light emitting element 110 in the light emitting device according to Embodiment 1. FIG. 7A is an illuminance distribution on the light diffusing plate, and FIG. 7B is the illuminance distribution on the light diffusing plate in a cross-section including optical axis LA shown in FIG. 6. The ordinate and abscissa in FIG. 7A and the abscissa in FIG. 7B represent a distance (mm) from the center of the light diffusing plate. The ordinate in FIG. 7B represents illuminance (lux).

As illustrated in FIGS. 6 to 7B, in light emitting device 100 according to Embodiment 1, emitted light having small angle with respect to optical axis LA is incident on concave surface 125 or rear surface 126, and refracted toward reflection surface 122. The light entered light flux controlling member 120 is reflected laterally by reflection surface 122. Then, the light reflected by reflection surface 122 is emitted from emission surface 123 to the outside of light flux controlling member 120. Emitted light having large angle with respect to optical axis LA, which does not reach concave surface 125 or rear surface 126, propagates laterally without being reflected by reflection surface 122. As illustrated, an extremely bright part was not caused over light emitting device 100 in the case of light emitting device 100 according to Embodiment 1.

Figure 8:
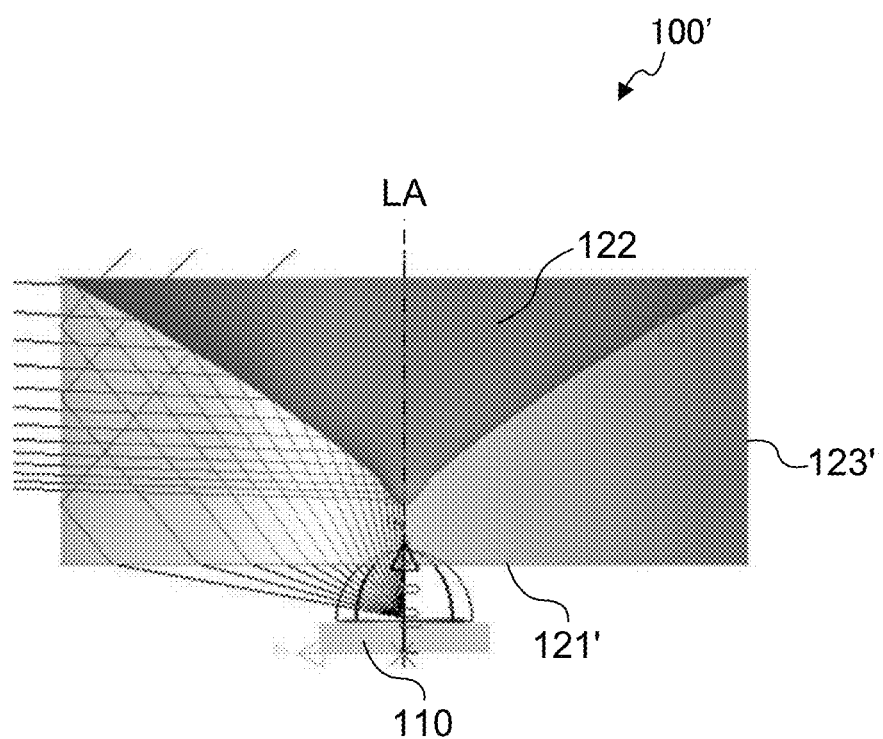
FIG. 8 is a view of optical paths in a light emitting device according to a comparative example.
Figure 9A:
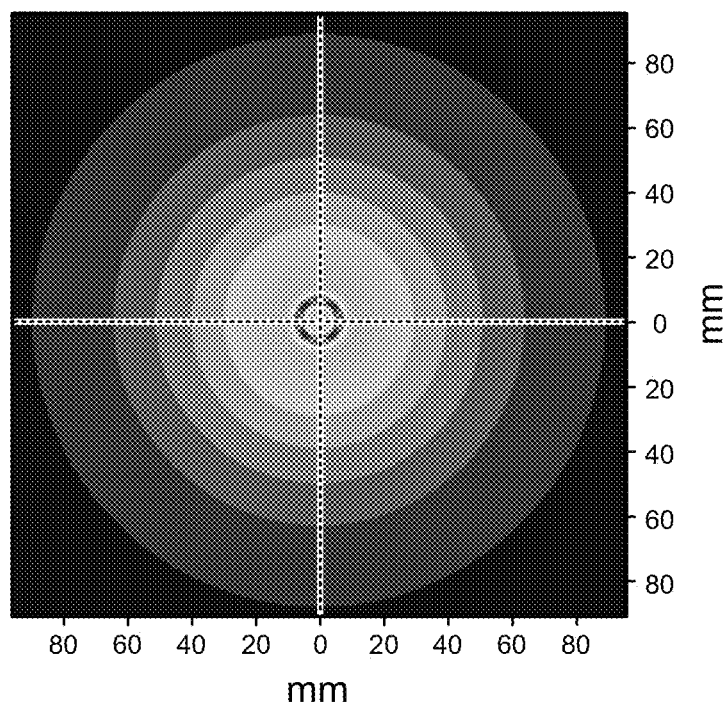
FIGS. 9A and 9B illustrate a simulation of light brightness using the light emitting device according to the comparative example.
Figure 9B:
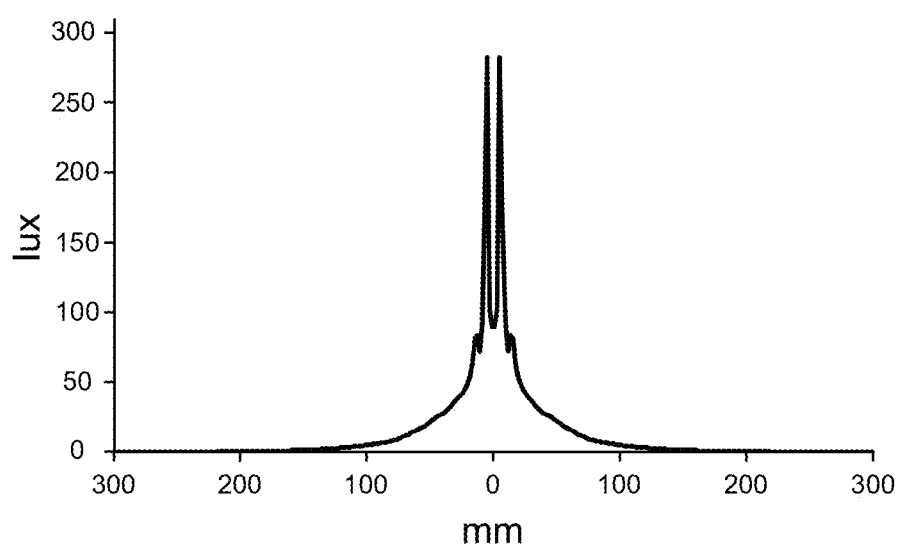

FIG. 8 is a view of optical paths of light emitted from the light emitting surface center of light emitting element 110 in light emitting device 100' according to the comparative example. FIG. 9A illustrates an illuminance distribution on the light diffusing plate, and FIG. 9B illustrates the illuminance distribution on the light diffusing plate in a cross-section including optical axis LA shown in FIG. 8. The ordinate and abscissa in FIG. 9A and the abscissa in FIG. 9B represent a distance (mm) from the center of the light diffusing plate. The ordinate in FIG. 9B represents illuminance (lux).

As illustrated in FIGS. 8 to 9B, in light emitting device 100' according to the comparative example, emitted light having small angle with respect to optical axis LA is incident on the central portion of incidence surface 121' and refracted toward reflection surface 122. The light entered light flux controlling member 120' is reflected laterally by reflection surface 122. Then, the light is emitted from emission surface 123' to the outside of the light flux controlling member. On the other hand, emitted light having large angle with respect to optical axis LA is incident on outer periphery of incidence surface 121' and refracted toward emission surface 123', and then reflected upward by emission surface 123'. The reflected light is emitted from reflection surface 122 to the outside of light flux controlling member 120'. Therefore, in light emitting device 100' according to the comparative example, part of light emitted from the light emitting surface of light emitting element 110 is controlled to propagate upward, so that an extremely bright part is caused over light emitting device 100'. Further, since inclining surface 127 is not formed, light flux controlling member 120' is larger in volume and heavier.

(Effect)

Since inclining surface 127 is formed in light flux controlling member 120 according to Embodiment 1, the weight of light flux controlling member 120 can be reduced. Also, the occurrence of an extremely bright part over light emitting device 100' can be prevented because the light emitted from the light emitting surface center of light emitting element 110 is not emitted upward as leaked light from light flux controlling member 120.

Embodiment 2

A surface light source device according to Embodiment 2 differs from surface light source device 400 according to Embodiment 1 only in the configuration of light emitting device 200. Accordingly, only light flux controlling member 220 according to Embodiment 2 will be described in the present embodiment.

(Configuration of Light Flux Controlling Member)

Figure 10:
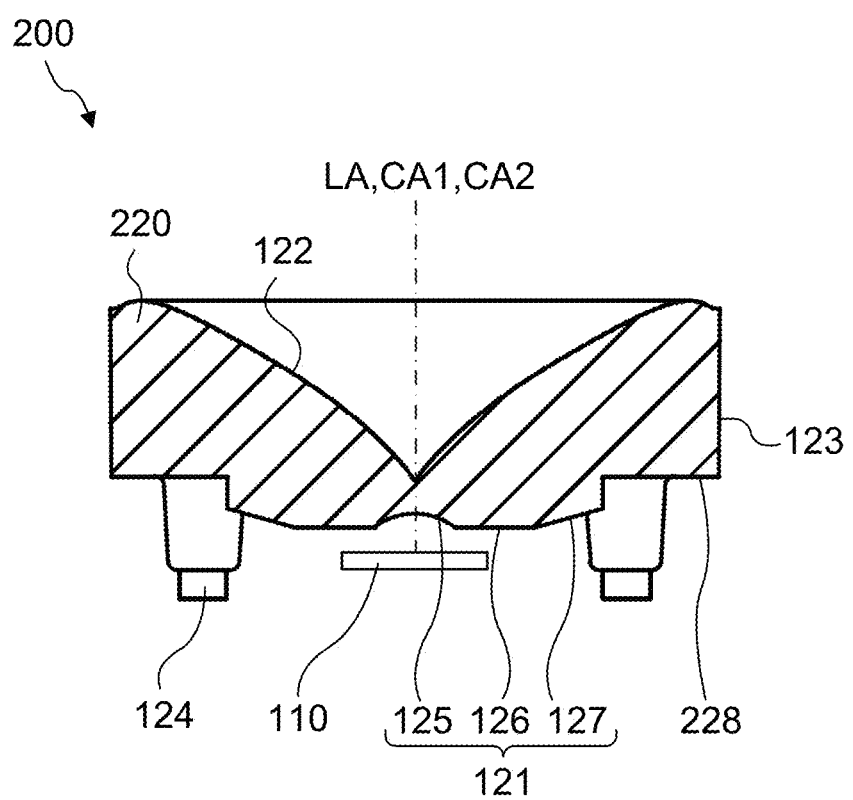
FIG. 10 is a cross-sectional view of a light emitting device according to Embodiment 2.
Figure 11A:
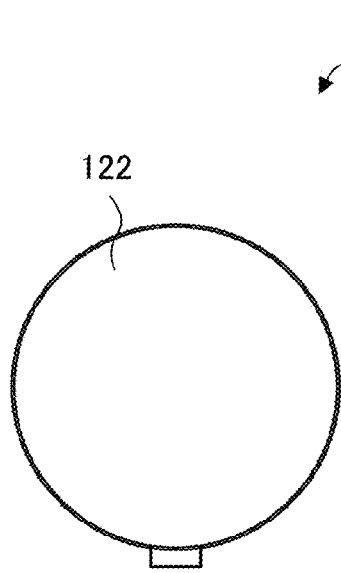
FIGS. 11A to 11C illustrate a configuration of a light flux controlling member according to Embodiment 2.
Figure 11B:
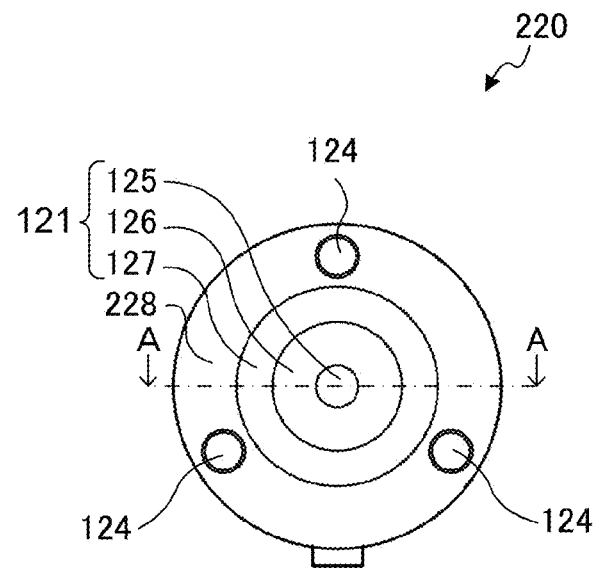

FIG. 10 is a cross-sectional view of light flux controlling member 200 according to Embodiment 2. FIG. 11A is a plan view, FIG. 11B is a bottom view and FIG. 11C is a side view of light flux controlling member 220.

Figure 11C:
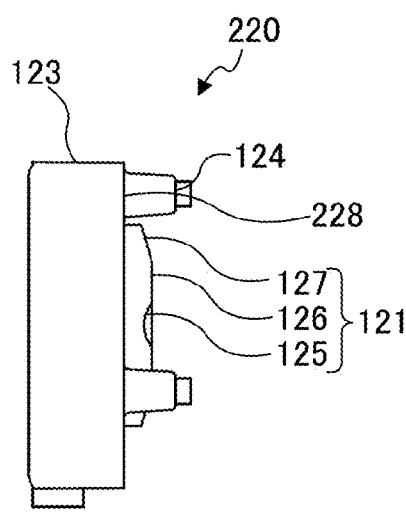

As illustrated in FIGS. 10 to 11C, light flux controlling member 220 comprises inspection reference surface 228 in addition to incidence surface 121, reflection surface 122 and emission surface 123.

Inspection reference surface 228 is disposed on the front side relative to inclining surface 127, and outside inclining surface 127. Light emitted from the light emitting surface center of light emitting element 110 does not directly reach inspection reference surface 228. Inspection reference surface 228 is a flat surface perpendicular to central axis CA1 (horizontal surface). Inspection reference surface 228 extends in the directions perpendicular to central axis CA1 from the outer rim part of inclining surface 127. Legs 124 are fixed on inspection reference surface 228. Accordingly, the dimensions in the height direction of legs 124, later-described emission surface 123 and the like of light flux controlling member 220 can be easily inspected with inspection reference surface 228 as a reference.

(Simulation)

Figure 12A:
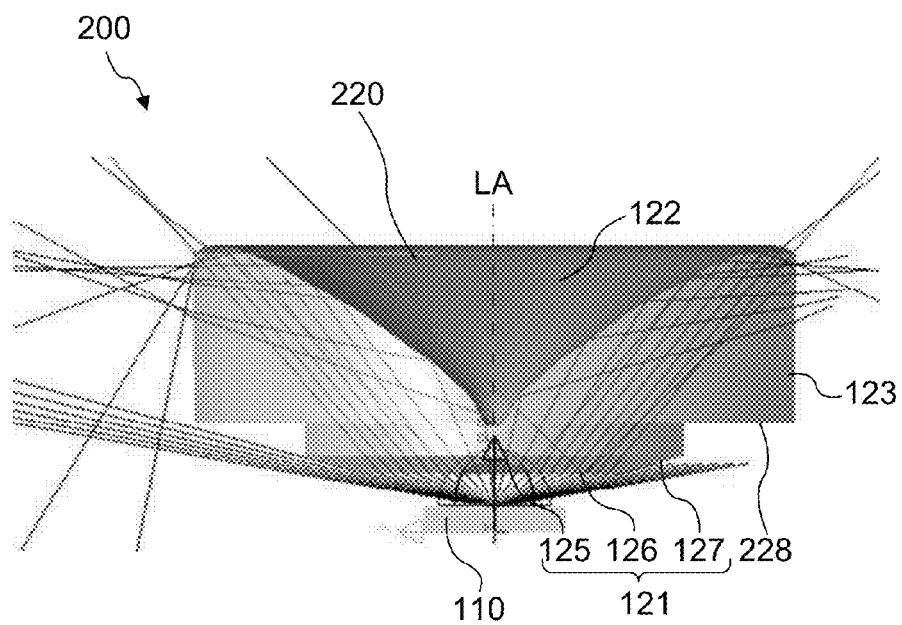
FIGS. 12A and 12B are views of optical paths in the light emitting device according to Embodiment 2.
Figure 12B:
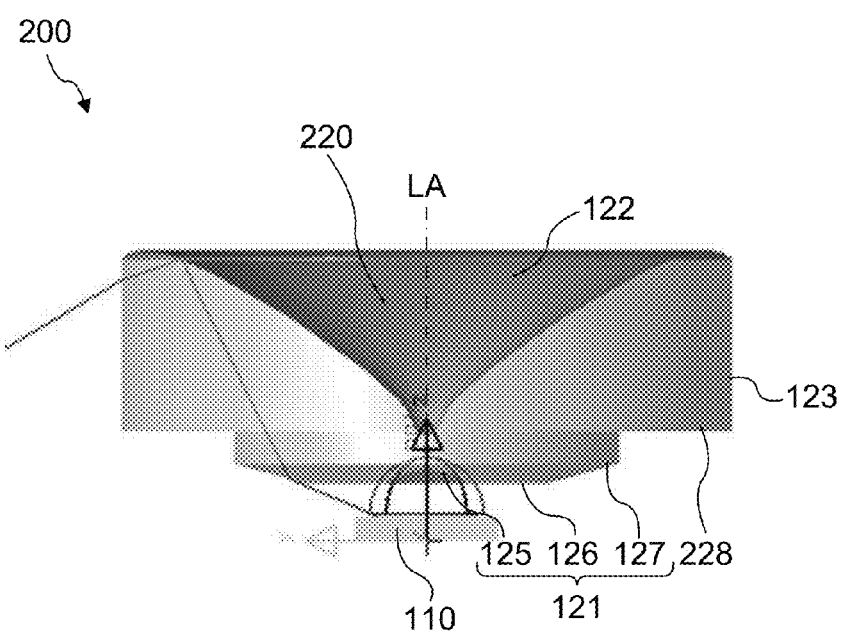

In light emitting device 200 according to Embodiment 2, FIG. 12A is a view of optical paths of light emitted from the light emitting surface center of light emitting element 110, and FIG. 12B is a view of an optical path of part of light emitted from the light emitting surface edge of light emitting element 110.

As illustrated in FIG. 12A, emitted light having small angle with respect to optical axis LA is incident on concave surface 125 or rear surface 126, and refracted toward reflection surface 122. The light entered light flux controlling member 220 is reflected by reflection surface 122 toward emission surface 123 disposed on the lateral side. Then, the light reflected by reflection surface 122 is emitted from emission surface 123 to outside of light flux controlling member 220. Emitted light having large angle with respect to optical axis LA, which does not reach concave surface 125 or rear surface 126, propagates laterally as it is. As illustrated above, in light emitting device 220 according to the present embodiment, light emitted from the light emitting surface center of light emitting element 110 can be controlled so as to propagate laterally.

Further, as illustrated in FIG. 12B, part of light emitted from the light emitting surface edge is incident on inclining surface 127 and refracted toward reflection surface 122. FIG. 12B illustrates an optical path of light which enters light flux controlling member 220, is reflected by reflection surface 122 toward emission surface 123 disposed on the lateral side, and emitted from emission surface 123 to outside of light flux controlling member 220. In this way, part of light emitted from the light emitting surface edge of light emitting element 110 is controlled so as to propagate laterally. Therefore, in light emitting device 200 according to the present embodiment, large part of light emitted from light emitting element 110 can be controlled so as to propagate laterally. Accordingly, light emitting device 200 allows larger amount of light to propagate laterally with respect to optical axis LA, so that a bright part is not easily caused over light emitting device 200 and luminance unevenness can be reduced. When light emitted from the light emitting surface edge of light emitting element 110, which enters from inclining surface 127 and is emitted without being reflected by reflection surface 122, is present, the light is refracted and emitted in a direction away from optical axis LA, so that a bright part is not easily caused over light emitting device 200. Even if light which propagates upward from light emitting device 200 is present, the light is emitted from the light emitting surface edge of light emitting element 110, which means the light has lower intensity (is darker) than light emitted from periphery of optical axis LA, so that a bright part is not easily caused over light emitting device 200.

Figure 13A:
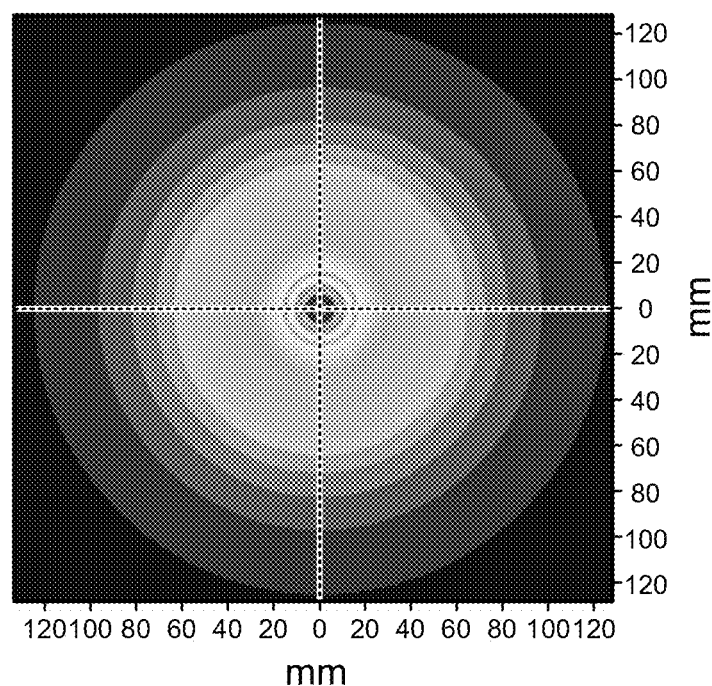
FIGS. 13A and 13B illustrate a simulation of light brightness using the light emitting device according to Embodiment 2.
Figure 13B:
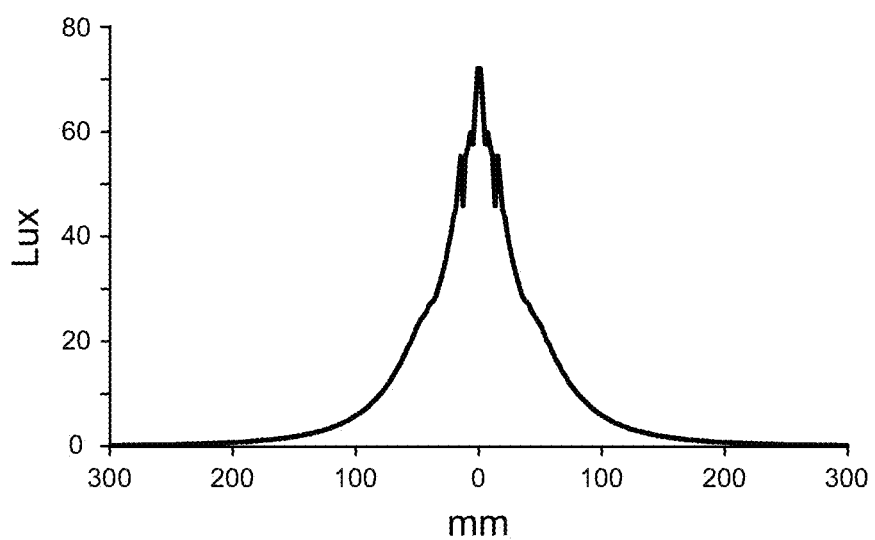

FIG. 13A illustrates an illuminance distribution on the light diffusing plate, and FIG. 13B illustrates the illuminance distribution on the light diffusing plate in a cross-section including optical axis LA shown in FIG. 12A. The ordinate and abscissa in FIG. 13A and the abscissa in FIG. 13B represent a distance (mm) from the center of the light diffusing plate. The ordinate in FIG. 13B represents illuminance (lux).

As illustrated in FIGS. 13A and 13B, an extremely bright part was not caused over light emitting device 200 in the case of light emitting device 200 according to the present embodiment because most of the light emitted from light emitting element 110 is controlled to propagate laterally.

As described above, light emitting device 200 according to Embodiment 2 has the same effect as light emitting device 100 according to Embodiment 1. Further, in light emitting device 200 according to Embodiment 2, inspection reference surface 228 is formed at the outer peripheral portion of incidence surface 121 disposed on the rear side, and therefore the dimension in the height direction of light flux controlling member 220 can be easily controlled compare to light emitting device 100 according to Embodiment 1.

Moreover, in light emitting device 200 according to Embodiment 2, part of light emitted from the light emitting surface center of light emitting element 110 does not enter light flux controlling member 200 but propagates laterally as it is. Moreover, part of light emitted from the light emitting surface edge is incident on inclining surface 127, reflected by reflection surface 122 and emitted laterally from emission surface 123. Therefore, most part of light emitted from light emitting element 110 can be controlled to propagate laterally to central axis CA1.

Embodiment 3

A light emitting device according to Embodiment 3 differs from light emitting device 100 according to Embodiment 1 only in the shape of reflection surface 322 of light flux controlling member 320. Hence, elements that overlap with those of light emitting device 100 of Embodiment 1 are provided with symbols that are the same as those of light emitting device 100, and descriptions thereof will be omitted.

(Configuration of Light Flux Controlling Member)

Figure 14A:
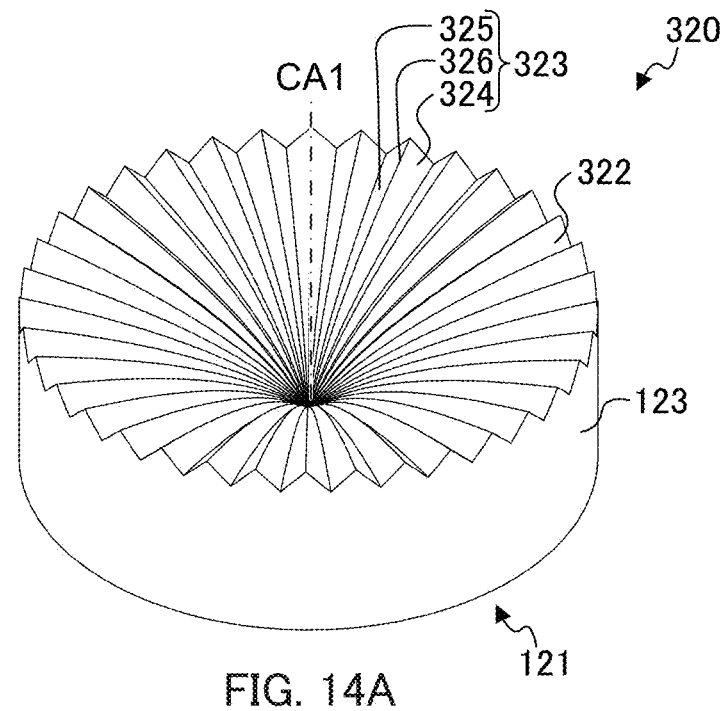
FIGS. 14A and 14B illustrate a configuration of a light flux controlling member according to Embodiment 3.
Figure 14B:
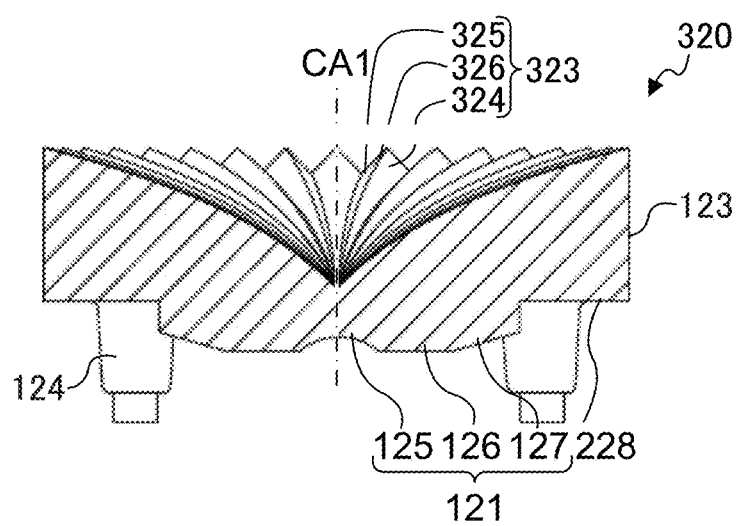

FIGS. 14A and 14B illustrate a configuration of light flux controlling member 320 according to Embodiment 3. FIG. 14A is a perspective view of light flux controlling member 320 and FIG. 14B is a cross-sectional view passing central axis CA1. As illustrated in FIGS. 14A and 14B, light flux controlling member 320 according to Embodiment 3 comprises incidence surface 121, inspection reference surface 228, reflection surface 322 and emission surface 123. Light flux controlling member 320 may comprise leg 124.

Reflection surface 322 comprises a plurality of protrusions 323. Each protrusion 323 is disposed from the center to the outer periphery of reflection surface 322. Protrusions 323 are disposed such that a trough is formed between adjacent protrusions 323. Any number of protrusions 323 may be provided accordingly. Each protrusion 323 comprises ridge line 326, first inclining surface 324 and second inclining surface 325. In a cross-section including central axis CA, ridge line 326 is a concave curve from the center to the peripheral portion with respect to light emitting element 110.

First inclining surface 324 and second inclining surface 325 are disposed such that the boundary thereof serves as ridge line 326. The cross-section area of protrusion 323 on a plane including a normal at ridge line 326, and orthogonal to first inclining surface 324 and second inclining surface 325 gradually increases in the direction from the center to the outer periphery.

(Simulation)

Figure 15A:
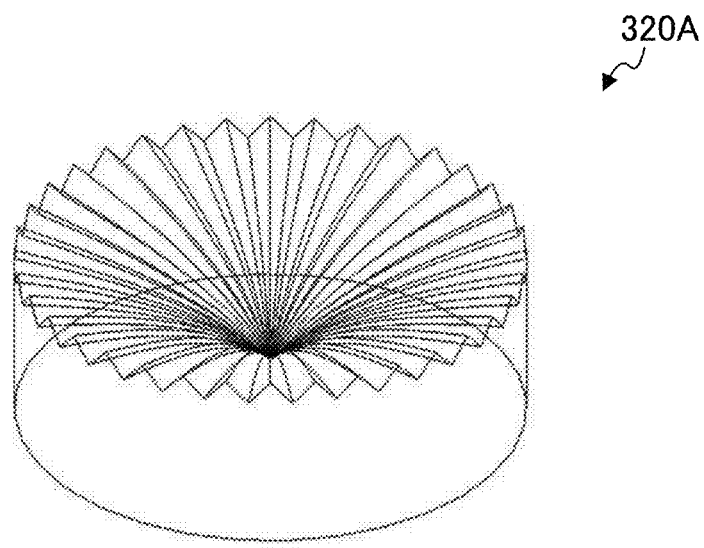
FIGS. 15A and 15B are perspective views of light flux controlling members used for a simulation.
Figure 15B:
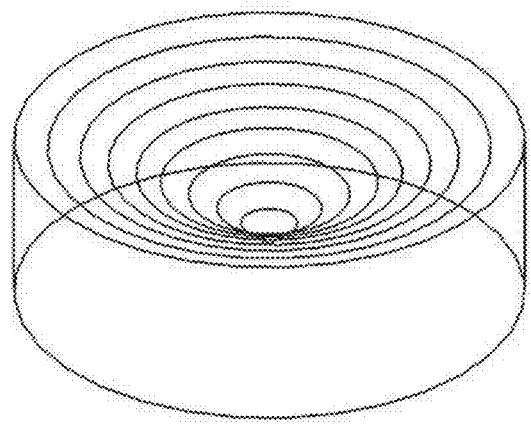

The effect of reflection surface 322 in the light emitting device according to Embodiment 3 was simulated. FIGS. 15A and 15B are perspective views of light flux controlling members used for the simulation. FIG. 15A is a perspective view of light flux controlling member 320A including reflection surface 322 (protrusions 323) of light flux controlling member 320 according to Embodiment 3, and FIG. 15B is a perspective view of a comparative light flux controlling member not including reflection surface 322 (protrusions 323). The diameter of light flux controlling member 320 used for the simulation was 13 mm, and the distance between light emitting element 110 and each light flux controlling member was set to be 1.2 mm.

Figure 16A:
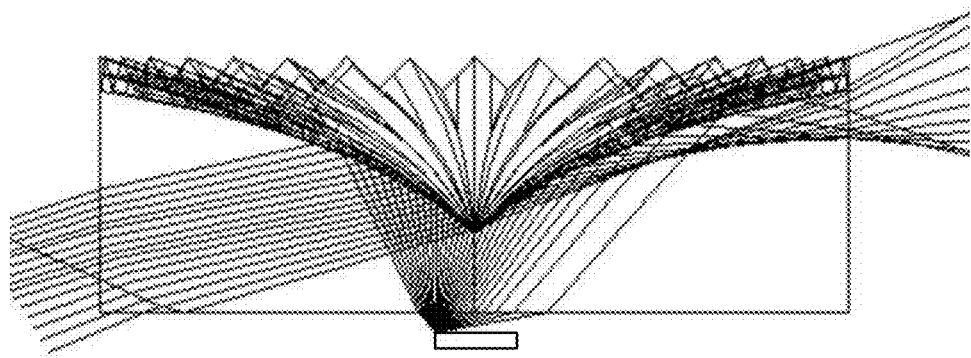
FIGS. 16A and 16B are views of optical paths showing the effect of a reflection surface in a light emitting device according to Embodiment 3.
Figure 16B:
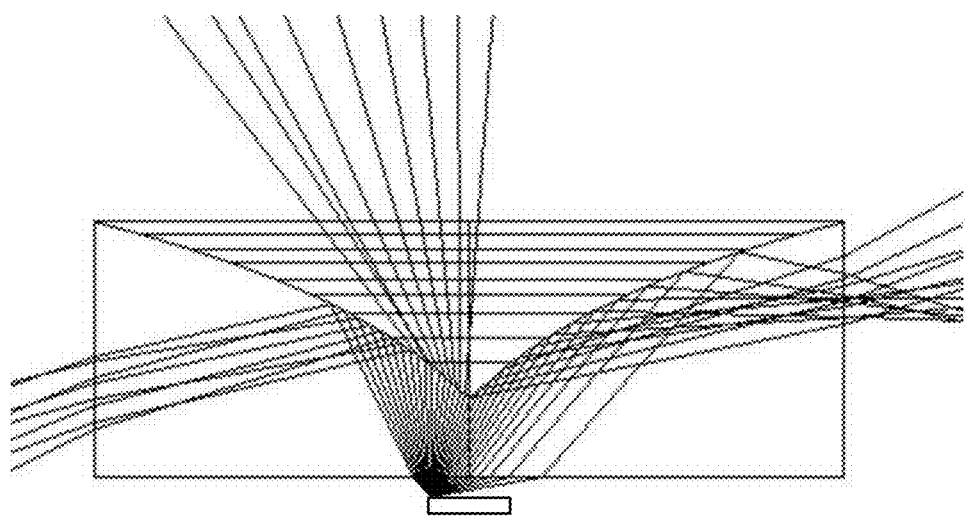
Figure 17:
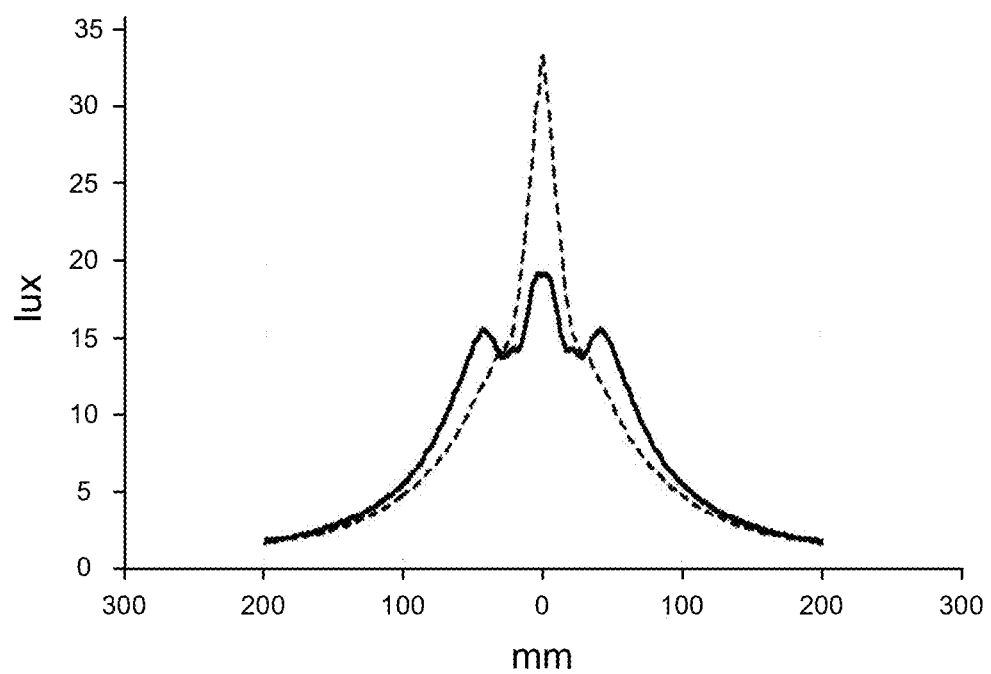
FIG. 17 illustrates the simulation of light brightness showing the effect of the reflection surface in the light emitting device according to Embodiment 3.

FIG. 16A is a view of optical paths of light emitted from the light emitting surface edge of light emitting element 110 using light flux controlling member 320A, and FIG. 16B is a view of optical paths of light emitted from the light emitting surface edge of light emitting element 110 using the comparative light flux controlling member.

The light entered light flux controlling member 320 on which reflection surface 322 is formed as illustrated in FIG. 16A is reflected more than once by protrusions 323 of reflection surface 322 (retroreflection). Compared to the light flux controlling member including the reflection surface without protrusion 323 illustrated in FIG. 16B, light flux controlling member 320A including reflection surface 322 with protrusions 323 illustrated in FIG. 16A has an increased effect of laterally reflecting light emitted from other than the light emitting surface center of light emitting element 110, which entered light flux controlling member 320A and reached the reflection surface. Specifically, the light entered the inside of light flux controlling member 320A reaches first inclining surface 324 (or second inclining surface 325). The light reached first inclining surface 324 (or second inclining surface 325) is reflected toward second inclining surface 325 (or first inclining surface 324), then re-reflected by second inclining surface 325 (or first inclining surface 324). Then, the light is emitted from emission surface 123 to outside of light flux controlling member 320A. As illustrated, in light emitting device 100 according to the present embodiment, light emitted from the light emitting surface edge of light emitting element 110 can be controlled so as to propagate laterally.

(Effect)

As described above, the light emitting device according to Embodiment 3 has the same effect as light emitting devices 100 and 200 according to Embodiments 1 and 2. Further, the light emitting device according to Embodiment 3 can control light to propagate laterally, which would pass through the light emitting device in the direction directly above the light emitting device. Therefore, the light emitting device according to Embodiment 3 can control larger amount of light to propagate laterally than light emitting devices 100 and 200 according to Embodiments 1 and 2.

Concave surface 125 may be a flat surface. In this case, concave surface 125 is formed on the same plane as rear surface 126.

INDUSTRIAL APPLICABILITY

The light emitting devices according to the present invention are useful as light sources of surface light source devices, for example.

REFERENCE SIGNS LIST 10 light source unit for radiating light
20 LED
30 optical element for converting light direction
31 incidence surface
32 reflection surface
33 emission surface
34 inclining surface
40 substrate
100, 200 light emitting device
110 light emitting element
120, 220, 320, 320A light flux controlling member 121 incidence surface
122, 322 reflection surface
123 emission surface
124 leg
125 concave surface
126 rear surface
127 inclining surface
323 protrusion
324 first inclining surface
325 second inclining surface
326 ridge line
228 inspection reference surface
400 surface light source device
410 casing
412 bottom plate
414 inner surface
416 top plate
420 light diffusion member

The invention claimed is:

1. A surface light source device comprising:
a light emitting device including a light emitting element, and a light flux controlling member configured to control a distribution of light emitted from the light emitting element, the light flux controlling member being disposed over the light emitting element; and
a light diffusion member configured to allow light emitted from the light emitting device to pass therethrough while diffusing the light,
wherein the light flux controlling member comprises:
an incidence surface configured such that light emitted from the light emitting element is incident on the incidence surface, the incidence surface comprising an outer incidence surface formed as an inclining surface such that a distance from the light emitting element increases as a distance from an optical axis of the light emitted from the light emitting element increases, and an inner incidence surface connected with an inside of the outer incidence surface,
a reflection surface configured to laterally reflect the light incident on the incidence surface, the reflection surface being disposed on a side of the light flux controlling member opposite to the incidence surface such that a distance from the light emitting element increases in a direction from a center to an outer periphery of the reflection surface, and
an emission surface configured to emit the light reflected by the reflection surface, the emission surface being disposed to surround the optical axis,
wherein light emitted from a light emitting surface center of the light emitting element does not reach the inclining surface, and
wherein light emitted from the light emitting surface center and travelling toward an area inside an outer edge of the inner incidence surface is incident on the inner incidence surface, and light emitted from the light emitting surface center and travelling toward an area outside the outer edge of the inner incidence surface reaches the light diffusion member without passing through the light flux controlling member.

2. The surface light source device according to claim 1, wherein the light flux controlling member further comprises:
a horizontal surface perpendicular to the optical axis, wherein the horizontal surface is disposed outside the outer incidence surface, and the light emitted from the light emitting surface center of the light emitting element does not directly reach the horizontal surface.

3. The surface light source device according to claim 2, wherein the reflection surface comprises:
a plurality of protrusions, each protrusion being disposed to connect the center with the outer periphery of the reflection surface,
wherein the protrusion comprises:
a first inclining surface,
a second inclining surface that pairs with the first inclining surface, and a ridge line that is a boundary of the first inclining surface and second inclining surface, wherein the ridge line is disposed to connect the center with the outer periphery of the reflection surface and is a concave curve with respect to the light emitting element.

4. A display apparatus comprising:
the surface light source device according to claim 3; and
a display member configured such that light emitted from the surface light source device is radiated to the display member.

5. A display apparatus comprising;
the surface light source device according to claim 2; and
a display member configured such that light emitted from the surface light source device is radiated to the display member.

6. The surface light source device according to claim 1, wherein the reflection surface comprises:
a plurality of protrusions, each protrusion being disposed to connect the center with the outer periphery of the reflection surface,
wherein the protrusion comprises:
a first inclining surface,
a second inclining surface that pairs with the first inclining surface, and a ridge line that is a boundary of the first inclining surface and second inclining surface, wherein the ridge line is disposed to connect the center with the outer periphery of the reflection surface and is a concave curve with respect to the light emitting element.

7. A display apparatus comprising:
the surface light source device according to claim 6; and
a display member configured such that light emitted from the surface light source device is radiated to the display member.

8. A display apparatus comprising:
the surface light source device according to claim 1; and
a display member configured such that light emitted from the surface light source device is radiated to the display member.

* * * * *